United States Patent
Ueda et al.

(10) Patent No.: US 10,300,475 B2
(45) Date of Patent: May 28, 2019

(54) CIRCUMFERENTIAL COATING MATERIAL AND CIRCUMFERENTIAL COATING HONEYCOMB STRUCTURE

(71) Applicant: NGK INSULATORS, LTD., Nagoya (JP)

(72) Inventors: Shuji Ueda, Nagoya (JP); Shungo Nagai, Nagoya (JP); Takayoshi Shibayama, Nagoya (JP); Yoshihiro Sato, Nagoya (JP); Makoto Murai, Nagoya (JP); Kojiro Hayashi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 15/844,748

(22) Filed: Dec. 18, 2017

(65) Prior Publication Data

US 2018/0178206 A1 Jun. 28, 2018

(30) Foreign Application Priority Data

Dec. 26, 2016 (JP) .................................. 2016-250400
Oct. 2, 2017 (JP) .................................. 2017-192358

(51) Int. Cl.
*B01J 35/04* (2006.01)
*B01D 53/94* (2006.01)
*B01J 37/02* (2006.01)
*B01J 21/08* (2006.01)

(52) U.S. Cl.
CPC .............. *B01J 35/04* (2013.01); *B01D 53/94* (2013.01); *B01J 21/08* (2013.01); *B01J 37/0215* (2013.01)

(58) Field of Classification Search
CPC . B01J 35/04; B01J 21/08; B01J 21/063; B01J 37/0215
USPC ............ 502/178; 106/286.8, 287.12, 287.13, 106/287.19, 287.34, 287.35, 712; 428/116; 252/88.2
See application file for complete search history.

(56) References Cited

U.S. PATENT DOCUMENTS

| | | | | | |
|---|---|---|---|---|---|
| 3,041,205 | A | * | 6/1962 | Iler | C04B 22/16 148/250 |
| 3,421,907 | A | * | 1/1969 | Rusher | C04B 24/16 106/14.13 |
| 5,302,683 | A | * | 4/1994 | Weidner | C08G 77/08 106/287.12 |
| 5,584,921 | A | * | 12/1996 | Wagner | C04B 41/4961 106/287.1 |

(Continued)

FOREIGN PATENT DOCUMENTS

| | | |
|---|---|---|
| JP | 2004-075523 A1 | 3/2004 |
| JP | 2004-075524 A1 | 3/2004 |

(Continued)

*Primary Examiner* — Patricia L. Hailey
(74) *Attorney, Agent, or Firm* — Burr & Brown, PLLC

(57) ABSTRACT

A circumferential coating material which is coated on a circumferential surface of a honeycomb structure monolithically formed by extrusion, to form a circumferential coating layer, the circumferential coating material containing fused silica in a range of 20 to 75 mass %, containing a color developing agent in a range of 5 to 50 mass %, containing colloidal silica in a range of 5 to 30 mass %, and further containing a silicon based water repellent agent in a range of 1 to 10 mass % to a total mass of the fused silica, the color developing agent, and the colloidal silica.

5 Claims, 1 Drawing Sheet

(56) References Cited

U.S. PATENT DOCUMENTS

| | | | |
|---|---|---|---|
| 2003/0162015 A1* | 8/2003 | Vanier | C09D 7/67 428/327 |
| 2007/0158879 A1 | 7/2007 | Suwabe et al. | |
| 2007/0269653 A1* | 11/2007 | Kanamori | B01J 31/069 428/336 |
| 2009/0033005 A1* | 2/2009 | Bookbinder | C04B 28/005 264/628 |
| 2011/0224071 A1 | 9/2011 | Okumura et al. | |
| 2011/0247312 A1* | 10/2011 | Bookbinder | B01D 15/00 60/39.12 |
| 2013/0040073 A1* | 2/2013 | Pett | C08J 7/123 427/596 |
| 2014/0170425 A1* | 6/2014 | Lin | C09D 1/00 428/447 |
| 2016/0074800 A1 | 3/2016 | Ito et al. | |

FOREIGN PATENT DOCUMENTS

| | | |
|---|---|---|
| JP | 5650022 B2 | 1/2015 |
| JP | 2016-055282 A1 | 4/2016 |

\* cited by examiner

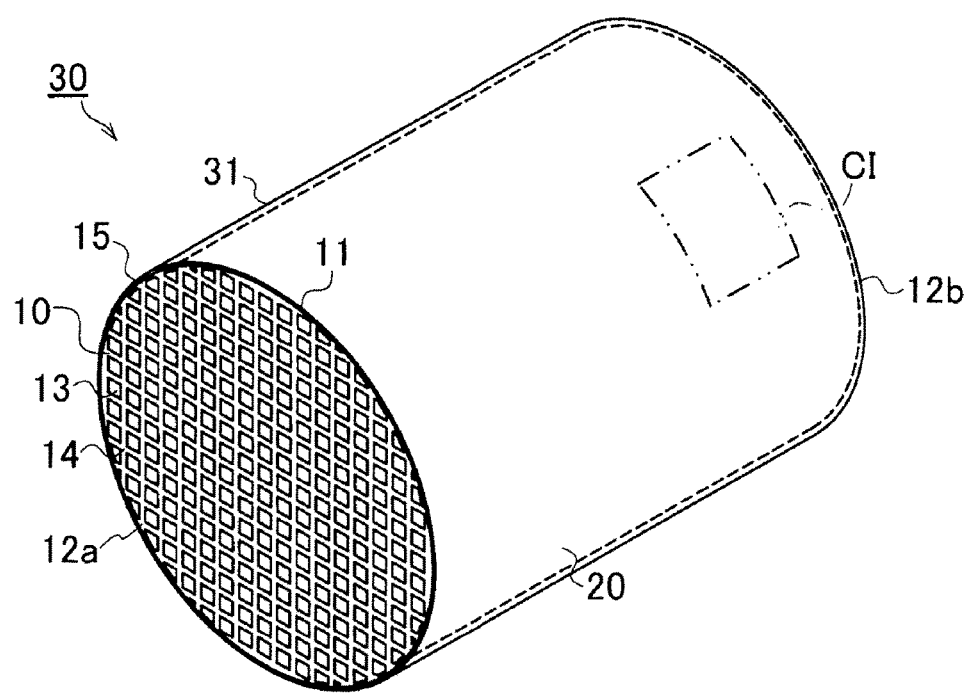

CIRCUMFERENTIAL COATING MATERIAL AND CIRCUMFERENTIAL COATING HONEYCOMB STRUCTURE

"The present application is an application based on JP-2016-250400 filed on Dec. 26, 2016 and based on JP-2017-192358 filed on Oct. 2, 2017 with Japan Patent Office, the entire contents of which are incorporated herein by reference."

BACKGROUND OF THE INVENTION

Field of the Invention

The present invention relates to a circumferential coating material and a circumferential coating honeycomb structure, and more particularly, it relates to a circumferential coating material which is coated on a circumferential surface of a honeycomb structure, to form a circumferential coating layer, and a circumferential coating honeycomb structure including the circumferential coating layer.

Description of the Related Art

Heretofore, honeycomb structures made of ceramics have been used in broad use applications such as a car exhaust gas purifying catalyst carrier, a diesel particulate removing filter, and a heat reservoir for a burning device. Such a honeycomb structure made of the ceramics (hereinafter referred to simply as "the honeycomb structure") is manufactured through a firing step of firing, at a high temperature, a honeycomb formed body extruded from a forming material (a kneaded material) into a desirable honeycomb shape by use of an extruder.

The honeycomb structure includes partition walls which are made of a porous material and which define a plurality of polygonal cells extending from one end face to the other end face and forming through channels for fluid. Furthermore, in the case of using the honeycomb structure as the car exhaust gas purifying catalyst carrier or the like, a catalyst is loaded onto inner portions of the honeycomb structure.

For example, a slurried catalyst solution including a noble metal based catalyst of platinum (Pt) or the like is poured into the honeycomb structure, and after elapse of a predetermined time, the catalyst solution is discharged from the inner portions of the honeycomb structure (a catalyst loading step). Afterward, a drying treatment and a baking treatment are performed to obtain a state where the catalyst is loaded onto the surfaces of the cells defined by the porous partition walls and inner portions of the partition walls. When this catalyst comes in contact with an exhaust gas flowing through the cells, the catalyst exerts its catalytic function, and hence it is possible to purify a toxic gas included in the exhaust gas emitted from a diesel engine or the like.

Particularly in recent years, there has been the problem that an exhaust gas emitted from a direct injection type gasoline engine also includes a large number of particulates of particulate matter and the like, and attaching of a particulate removing filter or the like has also been promoted as to a vehicle in which the direct injection type gasoline engine is mounted in the same manner as for the diesel engine.

It is generally known that the direct injection type gasoline engine has characteristics that its exhaust gas temperature is higher than that from the diesel engine. Therefore, the noble metal based catalyst loaded onto the honeycomb structure occasionally exerts a further higher catalytic performance (catalytic activity). Here, in the case of the direct injection type gasoline engine, a gasoline particulate filter (GPF) is usually used in which a honeycomb structure made of cordierite is used as a substrate.

In this GPF, it is required to decrease a difference between a pressure in one end face and a pressure in the other end face (pressure loss) in the honeycomb structure for the purpose of achieving improvement of output of the gasoline engine and low fuel consumption. Consequently, a high-porosity honeycomb structure (a high-porosity filter) is manufactured so that a porosity of the partition walls defining the cells is higher than that in a conventional honeycomb structure.

It is to be noted that in the present description, for example, a porosity of 50% or more is defined as "the high porosity". Furthermore, the problem is not limited to the GPF, and also in the case of a diesel particulate filter (DPF) to perform a purifying treatment of an exhaust gas emitted from the conventional diesel engine, the decrease of the pressure loss is required for the purpose of achieving the improvement of the output and the low fuel consumption, and the number of such honeycomb structures manufactured to have high-porosity partition walls also increases.

On the other hand, in recent years, there have often been wide varieties of use purposes and use targets of the honeycomb structures, and a large number of honeycomb structures have been manufactured in accordance with the respective use applications or the like. Therefore, it is difficult to visually identify the honeycomb structures from appearance shapes and the like. To eliminate the problem, information (product control information) required for product control in future is attached to the honeycomb structure at completion of the manufacturing of the honeycomb structure.

Specifically, the product control information is printed directly on the circumferential surface of the honeycomb structure by use of a printing technology of laser marking or the like. Consequently, it is possible to directly visually recognize, from the outside, a type of honeycomb structure, a product number of the honeycomb structure and the like. It is to be noted that here, examples of the product control information include various pieces of information such as a product name, the product number (a model number), a manufacturing number (a log number), a manufacturing period, a location of manufacture, and a manufacturing line number.

In particular, for the purpose of enabling collective display and control of a plurality of product control numbers, two-dimensional codes such as a well-known barcode and QR code (registered trademark) are increasingly printed on the circumferential surfaces of the honeycomb structures in place of printing numerals or characters thereon. The information concerning each honeycomb structure is easily obtainable from the two-dimensional code printed on the circumferential surface, by use of a reading device such as a barcode reader for exclusive use, and an operator or a checker can confirm the information converted into recognizable characters or numerals in a display screen.

As a result, it is possible to easily and immediately grasp a moving path of each honeycomb structure in a period from the completion of the manufacturing of the honeycomb structure until the honeycomb structure is mounted as the DPF or the GPF in a car, or the like, and a quantity of stock, a storage period, a storage location, a current state and the like in a period from when the honeycomb structure is conveyed into a warehouse of each factory until the honeycomb structure is used. In other words, traceability of the honeycomb structure is achievable and required information is immediately obtainable. Therefore, the printing of the product control information or the like in the two-dimensional barcode or the like on the circumferential surface of the honeycomb structure is extremely useful in terms of the product control.

It is to be noted that the printing of the product control information in the two-dimensional barcode or the like on the circumferential surface of the honeycomb structure can be performed, for example, by a method of coating a substrate material on the circumferential surface of the honeycomb structure by pad printing or the like, or by a well-known printing or print technology such as an ink jet printing method. Furthermore, as described above, the printing by the laser marking is performed by coating, on the circumferential surface of the honeycomb structure, a circumferential coating material which includes laser chromogenic raw material powder at a predetermined blend ratio, and irradiating the surface of the formed circumferential coating layer (a circumferential wall) with laser, to develop color only in an irradiated region (see Patent Document 1).

On the other hand, attempts are also made to decrease a thermal expansion coefficient between a substrate and a circumferential coating layer by adding, to the circumferential coating layer, a raw material having a low thermal expansion coefficient, e.g., the same cordierite component or amorphous silica as in the substrate (see Patent Documents 2, 3 and 4).

[Patent Document 1] JP-A-2016-55282
[Patent Document 2] JP5650022
[Patent Document 3] JP-A-2004-75523
[Patent Document 4] JP-A-2004-75524

SUMMARY OF THE INVENTION

The above GPF, DPF or the like is mounted in a vehicle such as a car, and hence in this filter, a small honeycomb structure having a comparatively small honeycomb diameter is used. Therefore, in the honeycomb structure, partition walls and a circumferential wall are often monolithically extruded and formed. In consequence, the partition walls and the circumferential wall have the same porosity (especially, a high porosity of 50% or more). Consequently, the following problems occasionally occur.

Specifically, in the case of loading a catalyst in the honeycomb structure in the above-mentioned catalyst loading step, there is the fear that a slurried catalyst solution introduced in the honeycomb structure passes the high-porosity partition walls and oozes out to a circumferential surface that is the surface of the circumferential wall of the honeycomb structure. Thus, a circumferential coating layer is provided on the circumferential surface as described in Patent Document 1 mentioned above, so that it is possible to inhibit the above-mentioned oozing of the catalyst solution to a certain degree. However, in this case, there is the possibility that the oozing of the catalyst solution is not sufficiently inhibited, and a part of the catalyst solution might ooze out to the circumferential surface.

A noble metal based catalyst of platinum or the like for use in the catalyst solution is comparatively expensive, and the catalyst which has oozed out to the circumferential surface cannot exert its catalytic function. Therefore, the noble metal based catalyst is wasted, which might be a factor for increase of manufacturing cost in manufacturing the DPF, GPF or the like.

Furthermore, the catalyst solution which has oozed outside might discolor the circumferential surface and interfere with reading of product control information displayed in the circumferential surface. In consequence, the reading of the product control information with a two-dimensional code occasionally becomes unstable, and causes defects such as a reading error and much time required in the reading.

On the other hand, after the catalyst loading step, there is usually performed a baking step of baking the catalyst onto the honeycomb structure (a substrate) at a temperature of, e.g., about 500° C. At this time, the circumferential coating layer occasionally noticeably contracts due to a difference in thermal expansion coefficient between the substrate and the circumferential surface. As a result, in the baking step and subsequent cooling, there is the fear that cracks are generated in the circumferential coating layer and that strength of the whole honeycomb structure (a circumferential coating honeycomb structure) deteriorates.

To eliminate the above defects, attempts are made to decrease the difference in thermal expansion coefficient between the substrate and the circumferential coating layer (see Patent Documents 2 to 4). However, for this circumferential coating layer, printability of the product control information by laser marking or the like is not taken into consideration. Therefore, in many cases, a printing performance to the circumferential coating layer is not sufficiently achievable.

In the laser marking, a temperature of an irradiated surface which is irradiated with laser (an irradiated region) locally rises. In this region where the temperature locally rises, a cordierite component, an amorphous silica component or the like included in the honeycomb structure melts, and the region occasionally vitrifies by the subsequent cooling. Consequently, in the case of reading the information from the laser printed surface by use of a reading device such as a barcode reader, laser light is reflected by the printed surface which is vitrified, and has the possibility of obstructing stable reading. Furthermore, it is described in Patent Documents 2 to 4 that the difference in thermal expansion coefficient is taken into consideration, but in the documents, description is not made as to the effect of inhibiting the catalyst solution from oozing out to the circumferential surface of the honeycomb structure in the catalyst loading step.

Thus, the present invention has been developed in view of the above actual situation, and objects thereof are to provide a circumferential coating material which inhibits a catalyst solution from oozing out to a circumferential surface when a catalyst is loaded onto a honeycomb structure including high-porosity partition walls, inhibits generation of cracks of a circumferential coating layer formed on the circumferential surface, and has an excellent printability by laser marking, and to provide a circumferential coating honeycomb structure having the circumferential coating layer formed by using the circumferential coating material.

According to the present invention, there are provided a circumferential coating material and a circumferential coating honeycomb structure as follows.

[1] A circumferential coating material which is coated on a circumferential surface of a honeycomb structure monolithically formed by extrusion, to form a circumferential coating layer, the circumferential coating material containing fused silica in a range of 20 to 75 mass %, containing a color developing agent in a range of 5 to 50 mass %, containing colloidal silica in a range of 5 to 30 mass %, and further containing a silicon based water repellent agent in a range of 1 to 10 mass % to a total mass of the fused silica, the color developing agent, and the colloidal silica.

[2] The circumferential coating material according to the above [1], further containing water in a range of 30 mass % or less to the total mass of the fused silica, the color developing agent, and the colloidal silica.

[3] The circumferential coating material according to the above [1] or [2], wherein the color developing agent is a mixture of silicon carbide and titanium oxide.

[4] A circumferential coating honeycomb structure in which the circumferential coating material according to any one of the above [1] to [3] is used, the circumferential coating honeycomb structure having a honeycomb structure including partition walls which define a plurality of cells extending from one end face to the other end face and forming through channels for fluid, and a circumferential coating layer formed by coating the circumferential coating material on the circumferential surface of the honeycomb structure.

[5] The circumferential coating honeycomb structure according to the above [4], wherein in the circumferential coating layer, an absolute value of a coefficient of temperature rising thermal expansion in a heating range of 40° C. to 800° C. and/or a coefficient of cooling thermal expansion in a cooling range of 800° C. to 40° C. is $3.5 \times 10^{-6}$/K or less.

According to a circumferential coating material of the present invention, the circumferential coating material is coated on a circumferential surface of a high-porosity honeycomb structure, to form a circumferential coating layer having a predetermined layer thickness, so that it is possible to prevent a catalyst solution from oozing out from the circumferential surface and to improve color development, readability and the like of laser marking onto the circumferential coating layer.

Furthermore, a circumferential coating honeycomb structure of the present invention includes the circumferential coating layer formed by using the circumferential coating material producing the above excellent effect. In particular, a difference in thermal expansion coefficient between a material for use in the circumferential coating layer (the circumferential coating material) and a material constituting the honeycomb structure is minimized, so that it is possible to inhibit generation of cracks of the circumferential coating layer in a baking step after a catalyst is loaded.

BRIEF DESCRIPTION OF THE DRAWINGS

FIG. 1 is a perspective view schematically showing one example of a constitution of a circumferential coating honeycomb structure of the present invention, and display of product control information.

DESCRIPTION OF THE PREFERRED EMBODIMENTS

Hereinafter, description will be made as to embodiments of a circumferential coating material of the present invention and a circumferential coating honeycomb structure in which the circumferential coating material is used with reference to the drawing. The present invention is not limited to the following embodiments, and changes, modifications, improvements and the like are addable without departing from the gist of the present invention.

A circumferential coating material of one embodiment of the present invention can be coated on a circumferential surface 11 of an after-mentioned honeycomb structure 10, to form a circumferential coating layer 20 in a predetermined layer thickness through treatments of drying and the like. A circumferential coating honeycomb structure 30 of one embodiment of the present invention includes the honeycomb structure 10, and the circumferential coating layer 20 mentioned above on the circumferential surface 11 of the honeycomb structure 10.

The circumferential coating material contains fused silica, a color developing agent, and colloidal silica as coating main components, and further contains a silicon based water repellent agent and water as components other than the above coating main components. It is to be noted that description will be made as to a content ratio (a blend ratio) of each of components such as the coating main components, the silicon based water repellent agent and colloidal silica later in detail.

Here, fused silica is so-called "quartz glass" containing 100% of silicon dioxide as a main component, has a comparatively high transparency and a high heat resistance, and is white in a state of powder. Furthermore, there are not any special restrictions on the color developing agent as long as the agent has a performance (laser printability) to develop black when irradiated with laser during laser marking, and in the circumferential coating material of the present embodiment, a mixture obtained by mixing silicon carbide and titanium oxide at a suitable blend ratio is mainly used.

On the other hand, colloidal silica is colloid of silicon dioxide or its hydrate, and mainly functions as a bonding material (an inorganic binder). The above respective components are mixed at a suitable blend ratio, to constitute the circumferential coating material of the present embodiment. Here, the silicon based water repellent agent includes a silicone compound such as silicone oil, or a silane compound forming the silicone compound by polymerization, and the silicon based water repellent agent for use can suitably be selected from the group consisting of various silicone compounds or silane compounds.

The honeycomb structure 10 substantially possesses a round pillar shape (see FIG. 1), and is manufactured through steps including a firing step of firing, at a high temperature, a honeycomb formed body (not shown) formed by extrusion. The honeycomb structure 10 including a cordierite component as a main component is utilized, and it is presumed that the honeycomb structure has a comparatively small honeycomb diameter. It is to be noted that the honeycomb structure 10 is not limited to the above honeycomb structure including the cordierite component as the main component, and any type of ceramic material may be used.

Further specifically, the honeycomb structure 10 includes partition walls 14 which define a plurality of cells 13 extending from one end face 12a to the other end face 12b and forming through channels for fluid such as an exhaust gas, and a circumferential wall 15 forming a circumference of the honeycomb structure 10, and the partition walls 14 and the circumferential wall 15 are monolithically formed. Therefore, the partition walls 14 and the circumferential wall 15 have the same porosity in a range of, e.g., 50% to 70%. That is, the honeycomb structure 10 possesses a high porosity. Here, an outside surface of the circumferential wall 15 corresponds to the circumferential surface 11 of the honeycomb structure 10, and the circumferential coating layer 20 is formed on the circumferential surface 11 (details will be described later).

On the other hand, as described above, the circumferential coating material to form the circumferential coating layer 20 includes fused silica, the color developing agent consisting of the mixture of silicon carbide and titanium oxide, and colloidal silica of the bonding material as the coating main components, and the silicon based water repellent agent and water are added to a total mass of the coating main components at a predetermined blend ratio. It is to be noted that the circumferential coating material includes the silicon based water repellent agent and water, whereby the circumferential coating material which has just been prepared possesses a slurry state. Therefore, the circumferential coating material can be coated on the circumferential surface 11 of the honeycomb structure 10, and then dried or treated otherwise, to form the layer in the predetermined layer thickness.

Description will be made as to the respective components of the circumferential coating material in detail. The circumferential coating material of the present embodiment contains fused silica in a range of 20 to 75 mass %, contains the color developing agent in a range of 5 to 50 mass %, and contains colloidal silica in a range of 5 to 30 mass %. Furtheiiiiore, the silicon based water repellent agent is added in a range of 1 to 10 mass % to a total mass of these coating main components. It is especially preferable to contain the silicon based water repellent agent in a range of 2 to 10 mass % in that the catalyst solution is prevented from oozing outside.

Additionally, it is preferable that the circumferential coating material contains water as an additive to the silicon based water repellent agent in a range of 30 mass % or less to the total mass of the coating main components. It is to be noted that the water may be contained in the range of 30 mass % or less as described above, and it is not necessarily required to add the water to the coating main components. That is, a content ratio (an addition ratio) of the water may be 0 mass %. Specifically, the water is usable in suitably adjusting viscosity of the circumferential coating material to improve coating properties (e.g., spray coating properties, etc.) when the material is coated on the circumferential surface 11 of the honeycomb structure 10. It is especially preferable to contain the water in a range of 10 to 30 mass %, because the coating properties improve when the circumferential coating material is coated on the circumferential surface 11 of the honeycomb structure 10.

When the respective components are prepared in the above-mentioned range of the content ratios, it is possible to form the circumferential coating layer 20 which prevents the catalyst solution from oozing out to the circumferential surface 11 (the circumferential wall 15), inhibits generation of cracks, and has an excellent laser printability.

In particular, the circumferential coating material is different from a conventional circumferential coating material in that the silicon based water repellent agent is added to the coating main components, and hence it is possible to prevent the catalyst solution from oozing out to the circumferential surface 11. Furthermore, it is possible to decrease the difference in thermal expansion coefficient between the circumferential coating material and the honeycomb structure 10 (a substrate), thereby decreasing the possibility of the generation of the cracks in the circumferential coating layer 20 due to a difference in contraction coefficient between the circumferential coating layer 20 and the honeycomb structure 10, even when the circumferential coating honeycomb structure 30 is exposed to the high temperature.

Furthermore, a mixture obtained by mixing two types of components of silicon carbide and titanium oxide is used as the color developing agent. This combination can improve color development properties (the laser printability) during the irradiation with the laser. Here, in the mixture of silicon carbide and titanium oxide, for example, a content ratio of titanium oxide can be equal to or larger than a content ratio of silicon carbide. Furthermore, there are not any special restrictions on the content ratios as long as a content ratio of the whole color developing agent of the combination of silicon carbide and titanium oxide is in a range of 5 to 50 mass % to the coating main components. When the above conditions are satisfied, the laser printability of the circumferential coating layer 20 formed on the circumferential surface 11 can improve. It has been described that the color developing agent consisting of the mixture of silicon carbide and titanium oxide is used in the circumferential coating material of the present embodiment, but the present invention is not limited to this example. That is, only silicon carbide or only titanium oxide may be used as the color developing agent. Furthermore, a component other than silicon carbide and titanium oxide may be used as long as the component has excellent color development properties, or the component may be added to the above silicon carbide, titanium oxide or the like for use.

The slurried circumferential coating material satisfying the above conditions and having the adjusted viscosity is coated on the circumferential surface 11 of the honeycomb structure 10 (the surface of the circumferential wall 15), and is then dried to form the circumferential coating layer 20, thereby obtaining the circumferential coating honeycomb structure 30 of the present embodiment including the honeycomb structure 10 and the circumferential coating layer 20.

Here, there are not any special restrictions on a method of forming the circumferential coating layer 20 on the circumferential surface 11 of the honeycomb structure 10. For example, there is usable a heretofore well-known technique such as a method of coating the slurried circumferential coating material in a uniform thickness on the circumferential surface 11 by spray coating or coating the material by roller coating. When the circumferential coating layer 20 is provided to surround the circumferential wall 15 of the honeycomb structure 10, the circumferential coating layer 20 can protect the honeycomb structure 10. Therefore, even when shock from the outside is added to the honeycomb structure 10, the honeycomb structure can be prevented from being damaged. Furthermore, not only dynamic strength but also thermal shock resistance and the like can improve.

Due to the improvement of the thermal shock resistance, it is possible to inhibit the generation of the cracks when the slurried catalyst solution is loaded onto inner portions of the circumferential coating honeycomb structure 30 and a baking treatment is performed at a baking temperature of about 500° C., because the difference in thermal expansion coefficient is small.

The coating main components include fused silica and the color developing agent at the predetermined content ratios, so that it is possible to suppress an amount of colloidal silica for use. As a result, for example, it is possible to prevent occurrence of trouble such as clogging or adhesion of the circumferential coating material in a nozzle outlet of a spray nozzle, when the circumferential coating material is coated on the circumferential surface 11 of the honeycomb structure 10 by the spray coating. In other words, colloidal silica has the above-mentioned function of the bonding material, and hence when a content of colloidal silica is large, the above-mentioned trouble easily occurs. Furthermore, during the roller coating, the circumferential coating material dries, and has a high possibility of adhering to the surface of a roller. Therefore, in the circumferential coating material of the present embodiment, the content ratio of the colloidal silica is suppressed as described above.

However, when the content ratio of colloidal silica is suppressed, there is the tendency that the viscosity of the circumferential coating material heightens. In consequence, there is the fear that handling properties during the spray coating or the roller coating deteriorate. To eliminate this problem, in the circumferential coating material of the present embodiment, water is added in a range of 30 mass % or less in addition to a silicone water repellent agent. Consequently, the viscosity of the circumferential coating material is prevented from heightening. It is to be noted that the water does not have to be added, as long as the viscosity can be suppressed even when the water is not added.

Furthermore, the two types of components are used as the color developing agent as described above in the circumferential coating material of the present embodiment. At this time, silicon carbide and titanium oxide for use in the circumferential coating material may be different from each other in particle diameter. For example, the circumferential coating material is used in which the particle diameter of titanium oxide is smaller than that of silicon carbide, and there is usable, for example, a combination of silicon carbide having the particle diameter in a range of 1.0 to 10 μm and titanium oxide having the particle diameter smaller than that of silicon carbide, in a range of 0.1 to 1.0 μm.

When the color developing agent having the fine particle diameter is used as described above, color develops uniformly in a region irradiated with the laser, and a two-dimensional code can clearly be developed (displayed) by laser printing. Furthermore, it is possible to prepare the circumferential coating layer which is dense, and it can be expected that properties to prevent the catalyst from oozing outside improve.

Furthermore, the circumferential coating material of the present embodiment is coated on the circumferential surface 11 of the honeycomb structure 10 in which porosities of the partition walls 14 and circumferential wall 15 are high in a range of 50 to 70%. In the circumferential wall 15 (the circumferential surface 11) of the honeycomb structure 10, fine pores opened outside (not shown) are present. In particular, the honeycomb structure has the high porosity in the range of 50 to 70%, and hence the number of the pores and open frontal areas of the pores increase. Consequently, there occurs the problem that the catalyst solution oozes outside as already described in the summary.

Thus, the circumferential coating material is coated on the circumferential surface 11, to form the circumferential coating layer 20, so that it is possible to close the fine pores opened in the circumferential surface 11 with the circumferential coating material. Consequently, even when the catalyst solution loaded onto the surfaces and inner portions of the partition walls 14 of the honeycomb structure 10 in the circumferential coating honeycomb structure 30 passes the partition walls 14 to reach the vicinity of the circumferential surface 11 of the honeycomb structure 10, the fine pores are closed with the circumferential coating layer 20, and hence the catalyst solution is inhibited from further oozing out from the circumferential surface 11.

Specifically, the catalyst solution is inhibited from oozing out from the circumferential coating layer 20 of the circumferential coating honeycomb structure 30 of the present embodiment, occurrence of a defect such as stickiness is prevented, and furthermore, for example, the problem that the catalyst solution adheres to a part of manufacturing equipment in a manufacturing process does not occur. Consequently, it is possible to suppress wasteful consumption of the catalyst solution containing an expensive noble metal based catalyst, and the problem that the manufacturing equipment is contaminated or the like is avoidable.

When the circumferential coating layer 20 made of the circumferential coating material is irradiated with laser (e.g., infrared laser) of a predetermined wavelength, a region irradiated with the laser only develops and changes to a black color. It is to be noted that the circumferential coating layer 20 usually possesses a pale gray color.

Therefore, characters, figures, various symbols and the like are displayed in black in background of a pale gray non-irradiated region. Consequently, clear contrast to the background is produced. In consequence, visibility by visual inspection heightens. It is to be noted that in the present description, "black" may not only indicate the black of a complete achromatic color but also indicate the black having brightness of 0 to 60% and exhibiting contrast between the black region and the above non-irradiated region. In other words, there are not any special restrictions on the black as long as excellent color development is achievable.

In particular, the circumferential coating material of the present embodiment is characterized by including titanium oxide as the color developing agent. Furthermore, the material includes fused silica. Thus, the material contains titanium oxide and fused silica, so that color of a laser printing surface 31 that is the surface of the circumferential coating layer 20 formed on the circumferential surface 11 of the honeycomb structure 10 can be brought further closer to a white color from the above pale gray color. For example, when the circumferential coating layer is made of the circumferential coating material which does not include titanium oxide, the color of the surface of the layer occasionally closely resembles a dark gray color or an ocher color. As a result, when the circumferential coating layer is irradiated with laser, silicon carbide develops the black color in the irradiated region, but the contrast between the irradiated region and the non-irradiated region decreases.

On the other hand, when titanium oxide and fused silica are added as parts of the coating main components to the circumferential coating material of the present embodiment as described above, the contrast between the irradiated region colored in black and the white non-irradiated region can increase. As a result, it is possible to decrease generation of reading errors in reading product control information CI (see FIG. 1) printed on the laser printing surface 31 by use of a barcode reader. Consequently, it is possible to efficiently carry out product control with a stable traceability after the circumferential coating honeycomb structure 30 is manufactured. It is to be noted that FIG. 1 shows the product control information CI in a part of the honeycomb structure 10 of the circumferential coating honeycomb structure 30 on the side of the other end face 12b. However, the present invention is not limited to this example, and the information can be printed at any position in any size as long as the information is printed on the laser printing surface 31 of the circumferential coating honeycomb structure 30 including the circumferential coating layer 20.

It is to be noted that the above description has been made mainly as to the excellent laser printability on the circumferential coating material of the present embodiment and the circumferential coating honeycomb structure 30, but the present invention is not limited to this example. For example, printability of ink jet printing can improve. Due to the circumferential coating layer 20, jet ink does not ooze into the circumferential coating layer 20 and the circumferential wall 15 of the honeycomb structure 10 which is a layer lower than the circumferential coating layer. Therefore, it is possible to display clear characters, clear numerals, or the clear two-dimensional code without any ooze.

Furthermore, the circumferential coating layer 20 in the circumferential coating honeycomb structure 30 of the present embodiment is adjusted so that an absolute value of a coefficient of temperature rising thermal expansion (a heating range: from 40° C. to 800° C.) and/or a coefficient of cooling thermal expansion (a cooling range: from 800° C. to 40° C.) is 3.5×10$^{-6}$/K or less. That is, each thermal expansion coefficient of the circumferential coating layer 20 formed on the circumferential surface 11 of the honeycomb structure 10 is limited to the above range. It is especially preferable that the absolute value of the coefficient of temperature rising thermal expansion and/or the coefficient of cooling thermal expansion is 3.0×10$^{-6}$/K or less, because an excellent thermal shock resistance is achievable.

When the values of the thermal expansion coefficients are large, it is indicated that a change ratio to a thermal change is large. Therefore, when the absolute value of each thermal shock resistance is within the above range, a change from 40° C. to 800° C. and a change from 800° C. to 40° C. decrease. Therefore, it is possible to decrease the difference in thermal expansion coefficient between the circumferential coating material and the honeycomb structure 10 including the circumferential coating layer 20. As a result, when the baking treatment of the catalyst is performed, the difference in thermal expansion coefficient between the honeycomb structure 10 and the circumferential coating layer 20 decreases, and hence an occurrence ratio of a defect such as the generation of the cracks in the circumferential coating layer 20 decreases.

Furthermore, one example of the slurried circumferential coating material for use in the coating will be described. For example, a slurry specific weight of the circumferential coating material is adjustable in a range of 1.8 to 2.0 g/cm$^3$. Furthermore, colloidal silica performs a function of bonding silicon carbide and titanium oxide as described above, and also can perform a function of a bonding material (or an adhesive material) to bring the circumferential coating layer 20 in contact closely with the circumferential surface 11 of the honeycomb structure 10. It is to be noted that, for example, colloidal silica is usable in which an average diameter of dispersed silica particles is in a range of 13 to 17 nm.

Additionally, for example, in the case of the honeycomb structure 10 of a standard size, a film thickness of the circumferential coating layer 20 is adjustable to 100 μm or less. There are not any special restrictions on the film thickness of the circumferential coating layer 20 from the circumferential surface 11, as long as it is possible to sufficiently exert the effect of preventing the catalyst solution from oozing outside and it is also possible to minimize increase of a weight of the whole circumferential coating honeycomb structure 30 as well as increase of manufacturing cost which is caused by use of the circumferential coating material.

As described above, the circumferential coating material of the present embodiment and the circumferential coating honeycomb structure 30 include the function of preventing the catalyst solution from oozing outside, and there are achievable the excellent color development during the laser printing and the excellent reading performance of the printing surface by the barcode reader or the like. Furthermore, the circumferential coating layer adjusted to a predetermined layer thickness can protect the honeycomb structure 10 from the circumferential wall.

Hereinafter, description will be made as to examples of the circumferential coating material and circumferential coating honeycomb structure of the present invention, but the circumferential coating material and circumferential coating honeycomb structure of the present invention are not limited to these examples.

EXAMPLES (1) Honeycomb Structure

A kneaded material obtainable by preparing a forming material at a predetermined blend ratio and mixing and kneading the material was extruded by utilizing an extruder, and a honeycomb formed body was obtained. The obtained honeycomb formed body was dried and then fired at a predetermined temperature to prepare a honeycomb structure. In the present example, the honeycomb structure included cordierite as a main component. The prepared honeycomb structure had porous partition walls, and the partition walls defined a plurality of cells. Here, a porosity of the obtained honeycomb structure is a high porosity in a range of 50 to 70%.

(2) Circumferential Coating Material

Table 1 to Table 3 mentioned below show values of respective content ratios of coating main components of fused silica, a color developing agent (silicon carbide+ titanium oxide) and colloidal silica of each circumferential coating material to be coated on a circumferential surface of the honeycomb structure prepared by the above (1) and content ratios of additive components (a silicon based water repellent agent and water) to be added to the coating main components (Examples 1 to 18 and Comparative Examples 1 to 6).

TABLE 1

| Component/evaluation item | | Unit/evaluation method | Example 1 | Example 2 | Example 3 | Example 4 | Example 5 |
|---|---|---|---|---|---|---|---|
| Coating main component | Colloidal silica | Mass % | 25.0 | 25.0 | 25.0 | 25.0 | 25.0 |
| | Fused silica | Mass % | 50.0 | 50.0 | 45.0 | 40.0 | 50.0 |
| | Color developing agent — Silicon carbide | Mass % | 12.5 | 5.0 | 5.0 | 10.0 | 5.0 |
| | Color developing agent — Titanium oxide | Mass % | 12.5 | 20.0 | 25.0 | 25.0 | 20.0 |
| | Subtotal | Mass % | 100.0 | 100.0 | 100.0 | 100.0 | 100.0 |
| Additive component | Water* | Mass % | 15.0 | 15.0 | 15.0 | 15.0 | 15.0 |
| | Water repellent agent A* | Mass % | 3.0 | 3.0 | 3.0 | 3.0 | 0.0 |
| | Water repellent agent B* | Mass % | 0.0 | 0.0 | 0.0 | 0.0 | 5.0 |
| Temperature rise thermal expansion coefficient (40-800° C.) | | ×10$^{-6}$/K | −0.39 | −0.03 | −1.87 | −1.58 | 0.96 |
| Cooling thermal expansion coefficient (800-40° C.) | | ×10$^{-6}$/K | 1.97 | 2.21 | 2.84 | 2.81 | 1.94 |
| Spray coating properties | | Visual inspection | Excellent | Excellent | Excellent | Excellent | Excellent |
| Adhesiveness | | Visual inspection | Excellent | Excellent | Excellent | Excellent | Excellent |

TABLE 1-continued

| | | | | | | |
|---|---|---|---|---|---|---|
| ESP safe temperature (first time/second time) ° C. or (first time) | | 650/650 | 650/650 | 650/650 | 650/650 | 650/650 |
| Readability (in conformity with ISO/IEC 15415) | Prior to thermal resistance test (visual inspection) | Excellent | Excellent | Excellent | Excellent | Excellent |
| | After thermal resistance test (visual inspection) | Excellent | Excellent | Excellent | Excellent | Excellent |
| Leak prevention properties | Visual inspection | Excellent | Excellent | Excellent | Excellent | Excellent |

| | Component/evaluation item | | Example 6 | Example 7 | Example 8 | Example 9 |
|---|---|---|---|---|---|---|
| Coating main component | Colloidal silica | | 25.0 | 25.0 | 25.0 | 25.0 |
| | Fused silica | | 50.0 | 50.0 | 50.0. | 50.0 |
| | Color developing agent | Silicon carbide | 0.0 | 5.0 | 5.0 | 5.0 |
| | | Titanium oxide | 25.0 | 20.0 | 20.0 | 20.0 |
| | Subtotal | | 100.0 | 100.0 | 100.0 | 100.0 |
| Additive component | Water* | | 15.0 | 15.0 | 15.0 | 15.0 |
| | Water repellent agent A* | | 5.0 | 0.0 | 0.0 | 0.0 |
| | Water repellent agent B* | | 0.0 | 1.0 | 3.0 | 7.0 |
| Temperature rise thermal expansion coefficient (40-800° C.) | | | −6.69 | 0.82 | 0.91 | 1.32 |
| Cooling thermal expansion coefficient (800-40° C.) | | | 2.55 | 1.79 | 1.88 | 2.38 |
| Spray coating properties | | | Excellent | Excellent | Excellent | Excellent |
| Adhesiveness | | | Excellent | Excellent | Excellent | Excellent |
| ESP safe temperature (first time/second time) or (first time) | | | 650/650 | 650 | 650 | 600 |
| Readability (in conformity with ISO/IEC 15415) | | | Good | Excellent | Excellent | Excellent |
| | | | Good | Excellent | Excellent | Excellent |
| Leak prevention properties | | | Excellent | Good | Excellent | Excellent |

*showing a mass ratio when a total mass of colloidal silica, fused silica, silicon carbide and titanium oxide is 100%.

TABLE 2

| Component/evaluation item | | Unit/evaluation method | Example 10 | Example 11 | Example 12 | Example 13 | Example 14 |
|---|---|---|---|---|---|---|---|
| Coating main component | Colloidal silica | Mass % | 25.0 | 25.0 | 25.0 | 30.0 | 20.0 |
| | Fused silica | Mass % | 50.0 | 50.0 | 70.0 | 20.0 | 30.0 |
| | Color developing agent — Silicon carbide | Mass % | 5.0 | 5.0 | 2.5 | 25.0 | 25.0 |
| | Color developing agent — Titanium oxide | Mass % | 20.0 | 20.0 | 2.5 | 25.0 | 25.0 |
| | Subtotal | Mass % | 100.0 | 100.0 | 100.0 | 100.0 | 100.0 |
| Additive component | Water* | Mass % | 15.0 | 15.0 | 10.0 | 15.0 | 20.0 |
| | Water repellent agent A* | Mass % | 0.0 | 0.0 | 0.0 | 0.0 | 0.0 |
| | Water repellent agent B* | Mass % | 9.0 | 10.0 | 3.0 | 3.0 | 3.0 |
| Temperature rise thermal expansion coefficient (40-800° C.) | | $\times 10^{-6}$/K | 1.51 | 1.73 | 0.72 | 1.60 | 1.82 |
| Cooling thermal expansion coefficient (800-40° C.) | | $\times 10^{-6}$/K | 2.92 | 3.17 | 1.07 | 3.48 | 3.23 |
| Spray coating properties | | Visual inspection | Excellent | Excellent | Excellent | Excellent | Excellent |
| Adhesiveness | | Visual inspection | Excellent | Excellent | Excellent | Excellent | Excellent |
| ESP safe temperature (first time/second time) ° C. or (first time) | | | 600 | 550 | 650 | 550 | 550 |
| Readability (in conformity with ISO/IEC 15415) | Prior to thermal resistance test (visual inspection) | | Excellent | Excellent | Good | Excellent | Excellent |
| | After thermal resistance test (visual inspection) | | Excellent | Excellent | Good | Excellent | Excellent |
| Leak prevention properties | | Visual inspection | Excellent | Excellent | Excellent | Excellent | Excellent |

TABLE 2-continued

| Component/evaluation item | | | Example 15 | Example 16 | Example 17 | Example 18 |
|---|---|---|---|---|---|---|
| Coating main component | Colloidal silica | | 15.0 | 10.0 | 5.0 | 30.0 |
| | Fused silica | | 60.0 | 75.0 | 75.0 | 50.0 |
| | Color developing agent | Silicon carbide | 15.0 | 10.0 | 10.0 | 5.0 |
| | | Titanium oxide | 10.0 | 5.0 | 10.0 | 15.0 |
| | Subtotal | | 100.0 | 100.0 | 100.0 | 100.0 |
| Additive component | Water* | | 20.0 | 25.0 | 30.0 | 0.0 |
| | Water repellent agent A* | | 0.0 | 0.0 | 0.0 | 7.0 |
| | Water repellent agent B* | | 2.0 | 3.0 | 3.0 | 0.0 |
| Temperature rise thermal expansion coefficient (40-800° C.) | | | 1.22 | 1.05 | 1.19 | −7.80 |
| Cooling thermal expansion coefficient (800-40° C.) | | | 1.87 | 1.68 | 2.07 | 3.10 |
| Spray coating properties | | | Excellent | Excellent | Excellent | Excellent |
| Adhesiveness | | | Excellent | Good | Good | Excellent |
| ESP safe temperature (first time/second time) or (first time) | | | 600 | 600 | 600 | 550 |
| Readability (in conformity with ISO/IEC 15415) | | | Excellent | Excellent | Excellent | Excellent |
| | | | Excellent | Excellent | Excellent | Excellent |
| Leak prevention properties | | | Excellent | Excellent | Excellent | Excellent |

*showing a mass ratio when a total mass of colloidal silica, fused silica, silicon carbide and titanium oxide is 100%.

TABLE 3

| Component/evaluation item | | | Unit/evaluation method | Comparative Example 1 | Comparative Example 2 | Comparative Example 3 | Comparative Example 4 | Comparative Example 5 | Comparative Example 6 |
|---|---|---|---|---|---|---|---|---|---|
| Coating main component | Colloidal silica | | Mass % | 25.0 | 35.0 | 25.0 | 3.0 | 32.0 | 25.0 |
| | Fused silica | | Mass % | 0.0 | 30.0 | 50.0 | 77.0 | 18.0 | 73.0 |
| | Color developing agent | Silicon carbide | Mass % | 37.5 | 15.0 | 5.0 | 5.0 | 20.0 | 0.0 |
| | | Titanium oxide | Mass % | 37.5 | 20.0 | 20.0 | 15.0 | 30.0 | 2.0 |
| | Subtotal | | Mass % | 100.0 | 100.0 | 100.0 | 100.0 | 100.0 | 100.0 |
| Additive component | Water* | | Mass % | 12.5 | 15.0 | 15.0 | 15.0 | 0.0 | 15.0 |
| | Water repellent agent A* | | Mass % | 0.0 | 0.0 | 0.0 | 0.0 | 0.0 | 0.0 |
| | Water repellent agent B* | | Mass % | 0.0 | 3.0 | 12.0 | 5.0 | 2.0 | 5.0 |
| Temperature rise thermal expansion coefficient (40-800° C.) | | | $\times 10^{-6}$/K | 2.15 | 1.36 | 1.95 | 1.20 | 1.60 | 0.70 |
| Cooling thermal expansion coefficient (800-40° C.) | | | $\times 10^{-6}$/K | 5.20 | 3.74 | 3.60 | 2.00 | 3.60 | 1.10 |
| Spray coating properties | | | Visual inspection | Excellent | Excellent | Excellent | Excellent | Failure | Excellent |
| Adhesiveness | | | Visual inspection | Excellent | Excellent | Excellent | Failure | — | Excellent |
| ESP safe temperature (first time/second time) or (first time) | | | ° C. | 500/500 | 500 | 500 | — | — | 650 |
| Readability (in conformity with ISO/IEC 15415) | | | Prior to thermal resistance test (visual inspection) | Excellent | Excellent | Excellent | — | — | Failure |
| | | | After thermal resistance test (visual inspection) | — | Excellent | Excellent | — | — | Failure |
| Leak prevention properties | | | Visual inspection | Failure | Excellent | Excellent | — | — | Excellent |

*showing a mass ratio when a total mass of colloidal silica, fused silica, silicon carbide and titanium oxide is 100%.

In Examples 1 to 18, each of content ratios of fused silica, a color developing agent, colloidal silica, a silicon based water repellent agent and water was within a range prescribed in the present invention, and in Comparative Examples 1 to 6, such a content ratio departed from the above range prescribed in the present invention. Furthermore, as the silicon based water repellent agent, two types of water repellent agents (the water repellent agent A and the water repellent agent B) were used. Additionally, the water repellent agent A was a silane compound and the water repellent agent B was a silicone compound. Comparative Example 1 was a constitution which did not include fused silica as a coating main component (=0.0 mass %) and did not include the silicon based water repellent agent (=0.0 mass %). Furthermore, in Examples 1 to 5, a mixture of silicon carbide and titanium oxide was used as the color developing agent, and in Example 6, only titanium oxide was used as the color developing agent. Additionally, in Comparative Example 1, the mixture of silicon carbide and titanium oxide was used as the color developing agent and a content ratio of the color developing agent to the coating main components increased. On the other hand, in Comparative Example 2, the content ratio of colloidal silica departed (=35.0 mass %) from an upper limit value (=30.0 mass %) of the range prescribed in the present invention, and in Comparative Example 3, the content ratio of the silicon based water repellent agent departed (=12.0 mass %) from an upper limit value (=10.0 mass %) of the range prescribed in the present invention. Furthermore, in Comparative Example 4, the content ratio of colloidal silica departed (=3.0 mass %) from a lower limit value (=5.0 mass %) of the range prescribed in the present invention, and the content ratio of fused silica departed (=77.0 mass %) from an upper limit value (=75.0 mass %) of the range prescribed in the present invention. In Comparative Example 5, the content ratio of colloidal silica departed (=32.0 mass %) from an upper limit value (=30.0 mass %) of the range prescribed in the present invention, and the content ratio of fused silica departed (=18.0 mass %) from a lower limit value (=20.0 mass %) of the range prescribed in the present invention, and in Comparative Example 6, the content ratio of the color developing agent departed (=2.0 mass %) from a lower limit value (=5.0 mass %) of the range prescribed in the present invention.

(3) Formation of Circumferential Coating Layer

Each circumferential coating material prepared by the above (2) was coated on the circumferential surface of the honeycomb structure prepared by (1), to form a circumferential coating layer. In the present example, the circumferential coating material was coated on the circumferential surface of the honeycomb structure by a spray system, to form the circumferential coating layer. At this time, an air pressure to coat the material on the circumferential surface by spraying was set to 0.20 MPa.

More specifically, the above honeycomb structure was mounted in a state of matching its axial direction with a vertical direction on a disc-like turntable (not shown). This turntable is turnable around the axial direction at a predetermined speed.

By turning the turntable, the honeycomb structure was rotated around the axial direction, and the circumferential coating material was sprayed from a spray nozzle fixed to a predetermined position at the above-mentioned air pressure. In the present example, the number of rotations of the turntable was set to a range of 80 to 90 rpm, and the circumferential coating material was sprayed as much as 1 to 2 g per second. Then, a spraying time was set so that about 4 to 6 g of circumferential coating material was coated on the circumferential surface of the honeycomb structure after completion of the spraying. Afterward, the material was dried at room temperature, so that there was obtainable a circumferential coating honeycomb structure in which the circumferential coating layer was formed on the circumferential surface of the honeycomb structure. Additionally, on layer surfaces of the formed circumferential coating layers, prescribed two-dimensional bar codes were printed, respectively, by use of a usual laser marking device, for aftermentioned evaluations of laser printing properties.

(4) Measurements of Temperature Rise Thermal Expansion Coefficient and Cooling Thermal Expansion Coefficient Each of coefficients of thermal expansion in heating and cooling was obtained by measuring an average thermal expansion coefficient in a temperature range of 40° C. to 800° C. (or 800° C. to 40° C.) of the circumferential coating layer by use of a differential detection type of thermal dilatometer. At this time, as a measurement sample for the measurement of the thermal expansion coefficient, there was used a test piece of the circumferential coating material which was compacted in a predetermined size in each of Examples 1 to 18 and Comparative Examples 1 to 6. Tables 1 to 3 show the measurement results.

(5) Evaluation of Spray Coating Properties

During the formation of the circumferential coating layer by the above (3), the coating properties of the circumferential coating material to be sprayed from the spray nozzle were evaluated by visual inspection. When the material was suitably sprayed from the spray nozzle, the coating properties were evaluated as "excellent", and when a defect such as clogging of the spray nozzle or dripping of the sprayed circumferential coating material from the circumferential surface occurred and the circumferential coating layer was not formable, the coating properties were evaluated as "failure". Such evaluation was performed by the visual inspection. Tables 1 to 3 show the evaluation results.

(6) Evaluation of Adhesiveness

There was performed an operation of attaching a masking tape for painting (product number: M40J30 manufactured by 3M Japan Limited) to a side peripheral surface (the circumferential coating layer surface) of the honeycomb structure including the formed circumferential coating layer, and then manually peeling off the tape. In an adhesive surface of the masking tape for painting which was peeled off from the honeycomb structure, an area to which the circumferential coating material adhered was measured. Additionally, it was visually confirmed whether or not the circumferential coating material adhered to the adhesive surface. In this case, when the adhered area was smaller than 30% to the whole area of the masking tape for painting, adhesiveness was evaluated as "excellent", and when the area was 30% or more and smaller than 80%, the adhesiveness was evaluated as "good". When the area was 80% or more, the adhesiveness was evaluated as "failure". Tables 1 to 3 show the evaluation results. Additionally, in Comparative Example 5, the circumferential coating layer was not formable, and hence the above adhesiveness was not evaluated.

(7) Measurement of ESP Safe Temperature

The circumferential coating honeycomb structure in which the circumferential coating layer was formed by the circumferential coating material of each of Examples 1 to 18 and Comparative Examples 1 to 6 mentioned above was thrown into an electrical furnace adjusted to a preset test temperature and installed in a room controlled at room temperature of 25° C., and the structure was held therein for 20 minutes. Afterward, the circumferential coating honeycomb structure was taken out from the electrical furnace and left to stand at room temperature for 3 minutes. Afterward, the circumferential coating layer of the circumferential coating honeycomb structure taken outside was confirmed by the visual inspection to confirm whether or not cracks were generated. Here, when a set temperature is, for example, 500° C., the test temperature to be preset is the set temperature plus room temperature of 25° C., i.e., 525° C.

When the presence of the cracks was not confirmed in the circumferential coating layer at the above test temperature, the set temperature of the electrical furnace was raised as much as +50° C. (the test temperature=575° C.). Then, there was performed a treatment of throwing the circumferential coating honeycomb structure into the electrical furnace, holding the structure in the furnace for 20 minutes, taking the structure out from the furnace, and leaving the structure stand at room temperature for 3 minutes, in the same manner as described above. Then, this test was repeated by performing the above treatment while raising the set temperature every 50° C. stepwisely until the cracks were generated.

In a stage where the cracks were generated in the circumferential coating layer, the measurement test of an electrical furnace spalling (ESP) safe temperature was ended, to calculate the ESP safe temperature=the test temperature (the set temperature+room temperature)−room temperature (25°

C.)–50° C. In the present embodiment, for the respective examples and comparative examples, the measurement of the ESP safe temperature was performed twice (for Examples 1 to 6 and Comparative Example 1) or performed once (for Examples 7 to 18 and Comparative Examples 2, 3 and 6). Tables 1 to 3 show the evaluation results. It is to be noted that as to the comparative examples in which the ESP safe temperature is not measured (Comparative Examples 4 and 5), Tables 1 to 3 show "-". Here, considering from a baking temperature (about 500° C.) in a baking step of a catalyst, the above ESP safe temperature is preferably 550° C. or more and further preferably 600° C. or more.

(8) Two-Dimensional Barcode Readability (Prior to a Heat Resistance Test)

Evaluation of readability of the two-dimensional barcode printed on a printing surface of the circumferential coating layer was performed by using a barcode reader (product model number: ICR840 manufactured by SICK AG). In this case, the evaluation of the readability was performed as to a plurality of evaluation items such as printing contrast and presence of chipping, an excessive region or the like in the printing on the basis of a judgement value of the readability by the barcode reader in conformity with ISO15415. Further specifically, when the barcode reader was held over the printed two-dimensional barcode, the barcode reader executed the reading 10 times, the evaluation was performed as to the respective items, and the barcode reader displayed general evaluation. The reading was performed at the respective times, and finally the lowest evaluation was obtained as overall evaluation. In the present embodiment, when a success ratio at the 10 reading times was high and there were not any practical problems, the readability was evaluated as "excellent", and when the success ratio at the 10 reading times was low but there were not any practical problems, the readability was evaluated as "good", and when there was the practical problem, the readability was evaluated as "failure". Here, Table 3 shows "-" as to the comparative examples where the readability of the two-dimensional barcode was not evaluated (Comparative Examples 4 and 5). Tables 1 to 3 show the obtained evaluation results.

(9) Two-Dimensional Barcode Readability (after the Heat Resistance Test)

Each circumferential coating honeycomb structure was disposed in a high-temperature furnace in which an in-furnace temperature was maintained at 650° C., for 3 hours and was subjected to a heat treatment, and as to the circumferential coating honeycomb structure after the heat resistance test, i.e., after elapse of 3 hours, the readability of the two-dimensional barcode was evaluated in the same manner as in the above (8). Tables 1 to 3 show the evaluation results.

(10) Evaluation of Leak Prevention Properties (Oozing Preventing Properties)

A pigment based ink (blue ink) adjusted to a predetermined concentration was sucked up from the end face of the circumferential coating honeycomb structure, and dried, and then evaluation was performed by confirming whether or not the blue ink oozing out from the surface of the circumferential coating layer was confirmable by visual inspection. In this case, when it was not confirmed that the blue ink oozed outside, anti-wetting properties were evaluated as "excellent", and when it was confirmed that the blue ink oozed outside but an area where the blue ink oozed outside was 10% or less of a total surface area of the circumferential coating layer, the properties were evaluated as "good", and when it was confirmed that the blue ink oozed outside and the area where the blue ink oozed outside was in excess of 10% of the total surface area of the circumferential coating layer, the properties were evaluated as "failure". It is to be noted that Table 3 shows "-" as to the comparative examples where the leak prevention properties were not evaluated (Comparative Examples 4 and 5). Tables 1 to 3 show the obtained evaluation results.

According to the above measurements and evaluations of (4) to (10), it has been confirmed that the circumferential coating material of each of Examples 1 to 18 and the circumferential coating honeycomb structure formed by using the circumferential coating material indicate excellent results, respectively. That is, it has been confirmed that the circumferential coating layer having an excellent printing performance is formed by using the circumferential coating material which uses colloidal silica as the bonding material, uses the color developing agent of silicon carbide and/or titanium oxide, and contains the coating main components further including fused silica, and the silicon based water repellent agent and water as the additive components at the predetermined ratio to the coating main components. Furthermore, there is obtainable the circumferential coating honeycomb structure which minimizes the thermal expansion coefficient and inhibits the generation of the cracks in the circumferential coating layer during heating and in which the catalyst solution does not ooze outside.

On the other hand, in the case of the circumferential coating material of each of Comparative Examples 1 to 6 which depart from the content ratios prescribed in the present invention, it has been confirmed that the leak prevention properties noticeably deteriorate, especially when the coating main components do not include fused silica, the content ratio of the color developing agent is high and the silicon based water repellent agent is not added (Comparative Example 1). Therefore, it has been confirmed that the presence of a certain amount or more of fused silica and the presence of the silicon based water repellent agent are essential. Furthermore, as a result, it has been indicated that when the coating main components do not include fused silica, the ESP safe temperature lowers (500° C.). Furthermore, when the content ratio of colloidal silica is excessively large (Comparative Example 2) or when the content ratio of the silicon based water repellent agent is excessively large (Comparative Example 3), the value of the coefficient of cooling thermal expansion is in excess of $3.50 \times 10^{-6}$/K and is insufficient for the thermal shock resistance. Additionally, when the content ratio of the colloidal silica is excessively small and the content ratio of fused silica is excessively large (Comparative Example 4), it has been confirmed that the adhesiveness of the circumferential coating material is low and that a large amount of circumferential coating material adheres to the masking tape for painting. In addition, when the content ratio of the color developing agent is small (Comparative Example 6), it has been confirmed that the readability deteriorates prior to the thermal resistance test and after the thermal resistance test.

A circumferential coating material and circumferential coating honeycomb structure of the present invention are utilizable in manufacturing a honeycomb structure which is suitably utilizable as a carrier for a catalyst device, or a filter in various fields of cars, chemistry, electric power, iron and steel, and the like. In particular, the present invention is suitably usable in a GPF to be employed for a direct injection type gasoline engine.

DESCRIPTION OF REFERENCE NUMERALS

10: honeycomb structure, 11: circumferential surface, 12a: one end face, 12b: the other end face, 13: cell, 14:

partition wall, 15: circumferential wall, 20: circumferential coating layer, 30: circumferential coating honeycomb structure, 31: printing surface, and CI: product control information.

What is claimed is:

1. A circumferential coating material which is coated on a circumferential surface of a honeycomb structure monolithically formed by extrusion, to form a circumferential coating layer,
   the circumferential coating material containing fused silica in a range of 20 to 75 mass %,
   containing a color developing agent in a range of 5 to 50 mass %,
   containing colloidal silica in a range of 5 to 30 mass %, and
   further containing a silicon based water repellent agent in a range of 1 to 10 mass % to a total mass of the fused silica, the color developing agent, and the colloidal silica.

2. The circumferential coating material according to claim 1, further containing water in a range of 30 mass % or less to the total mass of the fused silica, the color developing agent, and the colloidal silica.

3. The circumferential coating material according to claim 1,
   wherein the color developing agent is a mixture of silicon carbide and titanium oxide.

4. A circumferential coating honeycomb structure wherein the circumferential coating material according to claim 1 is used,
   the circumferential coating honeycomb structure comprising:
   a honeycomb structure comprising partition walls which define a plurality of cells extending from one end face to the other end face and forming through channels for fluid; and
   a circumferential coating layer formed by coating the circumferential coating material on the circumferential surface of the honeycomb structure.

5. The circumferential coating honeycomb structure according to claim 4,
   wherein in the circumferential coating layer, an absolute value of a coefficient of temperature rising thermal expansion in a heating range of 40° C. to 800° C. and/or a coefficient of cooling thermal expansion in a cooling range of 800° C. to 40° C. is $3.5 \times 10^{-6}$/K or less.

\* \* \* \* \*